Patented Dec. 9, 1941

2,265,945

UNITED STATES PATENT OFFICE 2,265,945

ORGANIC ACID SYNTHESIS

Donald J. Loder, Wilmington, Del., assignor to E. I. du Pont de Nemours & Company, Wilmington, Del., a corporation of Delaware No Drawing. Application April 9, 1938, Serial No. 201,179

8 Claims. (Cl. 260—530)

This invention relates to a process for the preparation of hydroxy organic acids and more especially to the preparation of such acids by the interaction of aldehydes higher than formaldehyde with carbon monoxide.

An object of the present invention is to provide an improved process for the preparation of hydroxy aliphatic, aromatic, cyclic and alicyclic acids. Another object of the invention is to provide an economical process for the preparation of acids from inexpensive raw materials. Yet another and more specific object of the invention is to provide a process for the preparation of hydroxy acids wherein an aldehyde, having more than one carbon atom, or a ketone is interacted with carbon monoxide in the presence of water, or a compound which decomposes to form water, and an acidic type catalyst. A further object is to provide catalysts for these processes. Other objects and advantages of the invention will hereinafter appear.

The above and other objects of the invention are realized by dissolving an aldehyde, having more than 1 carbon atom, or one of its polymers, in water, or a suitable solvent medium, and preferably in the presence of a catalyst having acidic characteristics, subjecting the resulting solution to heat and pressure and an atmosphere of carbon monoxide, whereupon a hydroxy acid is obtained in accordance with the equation: $RCHO + CO + HOH \rightarrow RCH(OH)COOH$ in which R may be hydrogen, an alkyl, aryl, aralkyl, cyclic or alicyclic group. Thus, for example, acetaldehyde yields lactic acid and the higher aldehydes, correspondingly higher hydroxy acids. This reaction may be carried out by placing the mixture of aldehyde, water and catalyst in an autoclave, applying the necessary pressure by forcing in carbon monoxide and effecting the reaction by the application of heat.

When acetaldehyde is reacted in the absence of added catalysts the reaction is initiated slowly but, being mildly autocatalytic, will proceed progressively more rapidly after it has started, since the hydroxy acid and acidic by-products of the reaction such as formic acid, accelerate the reaction. Initiation of the reaction is more rapid if a compound of an acidic nature, for example, an organic acid, such as formic acid, or an inorganic acid, such as hydrochloric, sulfuric or phosphoric acid is present, although the reaction will start without the addition of any substance in the nature of a catalyst.

Added catalysts are not, therefore, required to either institute or maintain the reaction when acetaldehyde is reacted, but I have found that they may be used with advantage, particularly with the higher aldehydes, to insure more rapid attainment of equilibrium conditions. The deleterious effect of certain side reactions may be lessened appreciably by accelerating the reaction by the use of a catalyst. Acidic substances, generally, i. e., those which give, in aqueous solution, a pH of less than 7, are suitable for catalyzing the reaction of this invention. Catalysts which are applicable, and all of which are of an acidic nature, include, for example, the inorganic acids and more particularly hydrochloric acid, sulfuric acid, and phosphoric acid; inorganic acidic salts, such, for example, as potassium acid sulfate, sodium acid phosphate and boron fluoride, etc. Organic acids and organic acid salts or esters may likewise be employed, such, for example, as formic acid and acetic acid. The seeding of the reaction with the hydroxy acid being produced likewise appears to aid in catalyzing the reaction.

In general, these catalysts may be used in amounts ranging up to one mol thereof per mol of aldehyde. Higher proportions, however, may also be used, in many instances, for example, in processes in which boron trifluoride or hydrochloric acid are employed as catalysts. Here, the catalyst may be used in amounts up to, and even greater, than equimolecular proportions with respect to the aldehyde, but usually, in order to facilitate the separation of the hydroxy acid or its derivative from the reaction product, and to limit side reactions, it is preferable to employ proportions of the catalyst within the range specified. It will be found that with increased catalyst amount the reaction will proceed at a lower temperature and/or pressure while with decreased catalyst amount a somewhat higher temperature and/or pressure is required to effect the reaction at an equal rate.

For the preparation of the hydroxy acids it is preferable to have present a quantity of water equal to from 0.5 to 1.0 mol of water per mol of aldehyde, although larger amounts of water may be used. When the reaction is conducted in an excess of water, the water performs a dual purpose, that is, as a solvent medium in which the reaction occurs and as one of the reactants, a portion of the water being consumed in the reaction. In the partial or complete absence of water esters will be formed, in the manner more particularly hereinafter described.

The aldehydes which may be used in my invention include the saturated and unsaturated aliphatic aldehydes such, e. g., as acetaldehyde (metaldehyde), propanal, butanal, isobutyraldehyde; the higher saturated aldehydes, such as palmitic aldehyde, stearic aldehyde, etc.; the unsaturated aldehydes such as acrolein, methacraldehyde, crotonaldehyde and the like; and the mixed aldehyde acids such as beta-formylacetic acid, alphahydroxy methylene propionic acid, etc.; aromatic, cyclic, alicyclic and heterocyclic aldehydes may likewise be reacted such, for example, as benzaldehyde, toluic aldehydes, phenylacetaldehyde, furfural, etc. Ketones may, in some instances, be used, together with, or in place of, the aldehydes, the simpler ketones such as dimethyl, diethyl, methyl-ethyl ketones being preferred, although higher ones may be used.

Partial or complete replacement of the water, in the reaction, may be made by substituting therefor a compound which, under the conditions of the reaction, decomposes to give water and especially such compounds as the aliphatic alcohols and ethers, e. g., methanol, ethanol, propanol, and the higher aliphatic alcohols, as well as their corresponding ethers.

The aldehyde and/or alcohol or ether may also be partially or completely replaced by the corresponding acetals such, for example, as acetal, and the higher compounds of this class, since the acetal combines the characteristics of the aldehydes and the alkoxy compounds such as the alcohols and ethers. Other substituted aldehydes may likewise be used such as the aldols, acetaldol and the like.

In place of water as the solvent medium in which the reaction is conducted, organic acids, their esters and anhydrides, in which the aldehydes are soluble or can be made soluble by the introduction of a solubilizing agent, may be substituted. Acids and their esters may be used in the presence of or in the entire absence of added water, while the anhydrides should be used in the absence of water. The substitution of an anhydrous acid gives a substituted hydroxy acid as the product; e. g., acetic acid, in a reaction using acetaldehyde, will give acetoxy lactic acid; when propionic acid is used in a like manner, propionoxy lactic acid is formed, and similarly with the higher acids, higher acyloxy substituted acids are produced from isobutyric acid, glycolic acid and the like. In similar manner, anhydrous inorganic acids as, e. g., hydrochloric acid, phosphoric acid, etc., will give in organic acid substituted hydroxy acids. When an acid is used in this capacity, it serves a dual purpose, namely, as a solvent and as one of the reactants; in this regard, it acts similarly to water.

The carbon monoxide required for the synthesis may conveniently be derived from various commercial sources, as, for example, from water gas, producer gas, etc., by liquefaction or other methods and should, for best results, be relatively pure. The carbon monoxide should preferably be present in sufficient excess to insure an adequate supply thereof for absorption by the formaldehyde in order to inhibit any appreciable decomposition of the aldehyde to carbon monoxide and hydrogen or other products.

The reaction proceeds at ordinary pressures although it is advantageous to use pressures in excess of atmospheric, say from 5 to 1500 atmospheres or more. The reaction, which is exothermic, may be effected over a wide range of temperatures although the optimum temperature varies with specific conditions depending upon the relative concentrations of catalysts, water, aldehyde or equivalent and carbon monoxide. Generally, the reaction can be carried out at temperatures ranging from 50° C. to 350° C., or higher although temperatures ranging between 150 and 300° C. have been found preferable. Mild cooling means should generally be provided to maintain the temperature within the selected range.

The reaction product, when acetaldehyde is treated, consists essentially of a solution containing the hydroxy acid, a small amount of formic acid, unconverted aldehyde, the catalyst, if such be used, and a considerable portion of water. The hydroxy acid may be separated from this crude mixture by distilling the more volatile reactants, which may be done at from 80 to 100 mm. mercury pressure. Alternatively, after distillation of the greater portion of the free water, formic acid, alcohol, and unchanged aldehyde, the residue may be neutralized, e. g., with calcium carbonate, to convert the hydroxy acid into a readily separable salt, or the residue may be esterified with a suitable alcohol for removal of the hydroxy acid as an ester. If desired, the hydroxy acid may be recovered from the concentrated solution by crystallization, after separation of the catalyst and removal of excess water by evaporation under reduced pressure.

When equivalents of acetaldehyde are used as, for example, acetals, aldols and the like, or when alcohols, ethers, esters, acids, or anhydrides are used in place of or together with water, the recovery steps are necessarily altered to conform with the type product obtained. Generally, the methods described above, with the use, if necessary, of well known recovery processes, will provide adequate means for effecting satisfactory recovery of the product.

The following examples will illustrate methods of practicing the invention although it will be understood that the invention is not limited to the details therein given.

*Example 1.*—Lactic acid was obtained by placing in a silver-lined autoclave an aqueous solution containing 1 mol of acetaldehyde, 9 mols of water and 0.1 mol of concentrated sulfuric acid. A carbon monoxide atmosphere was superimposed on the liquid and its pressure increased to 900 atmospheres. The autoclave and contents were heated to a temperature between 130 and 200° C. for a period of approximately 60 minutes, with continuous agitation.

*Example 2.*—In a manner similar to that described in Example 1, a mixture of hydroxy acids is obtained by the interaction of acetaldehyde and formaldehyde in substantially equal molal proportions with CO and water, using 0.1 mol of HCl as the catalyst, at a temperature between 100 and 230° C. and a pressure of approximately 900 atmospheres.

*Example 3.*—A mixture comprising 1.0 mol acetaldehyde, 2.0 mols acetic acid, 1.0 mol water and 0.2 mol hydrogen chloride was subjected to 900 atm. CO pressure at 110–115° C. In one-half hour the pressure dropped 315 atm., due to reaction between CO, acetaldehyde and water. The product was removed, mixed with an excess of n-butanol, and distilled. Butyl lactate was collected at 115–120°, and 20 mm.

*Example 4.*—217 grams of a mixture containing the following substances in the indicated molar ratios 1 acetone:1 HCl:1 formic acid:6 HOH was charged into a silver-lined shaker tube and heated at 160–180° C. under 900 atm. carbon monoxide pressure for 1 hour. The discharged product was found by analysis to contain alpha-hydroxyisobutyric acid, M. P. 73–76° C.

While the examples have referred particularly to carrying out the process in a more or less discontinuous manner the process of the invention may likewise be effected in a continuous manner, e. g., by passing the aldehyde or its equivalent, water or its equivalent, and catalyst through a reaction zone either co-current or countercurrent to the flow of carbon monoxide, the rates of flow being adjusted to yield the desired degree of reaction. The carbon monoxide should be maintained, as in the processes described in the examples, at a suitable pressure and the temperature of the continuous reaction should be held within the desired range by suitable heating means.

In order to insure adequate intimate contact between the reactants, thorough stirring is an essential to high yields when conducting the process in an autoclave and, no matter what the type of reaction vessel used, intimate contact is of considerable importance if optimum results are desired.

Because of the corrosive nature of the catalyst and reactants it is advisable to carry out the process of the present invention in glass, silica, porcelain-lined or glass-lined vessels, or the inner surfaces of the reaction vessel which contact the reactants should be constructed of such corrosion-resistant metals as silver, chromium, stainless steel or the like.

When an aldehyde is referred to in the appended claims it will be understood that its polymeric and monomeric forms are also included.

From a consideration of the above specification it will be appreciated that many details therein given may be changed without departing from the scope of the invention or sacrificing any of the advantages that may be derived therefrom.

I claim:

1. In a process for the preparation of an organic acid, the step which comprises reacting in the presence of a solvent and in the liquid phase carbon monoxide with a compound having the chemical formula:

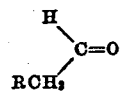

in which R represents a radical selected from the group consisting of hydrogen, alkyl, aralkyl, cyclic and alicyclic radicals, at a temperature between 50 and 350° C. and at a presure in excess of atmospheric.

2. The process of claim 1 in which the solvent is an acid.

3. The process of claim 1 in which the solvent is an organic acid.

4. The process of claim 1 in which the solvent is acetic acid.

5. In a process for the preparation of a hydroxy organic acid, the step which comprises reacting in the liquid phase an aldehyde having more than one carbon atom with carbon monoxide and water at a temperature between 50 and 350° C. and at a pressure in excess of atmospheric.

6. The process of claim 5 in which the aldehyde is acetaldehyde.

7. A process for the preparation of a hydroxy organic acid which comprises reacting in the liquid phase an aldehyde having more than one carbon atom with carbon monoxide and water in the presence of sulfuric acid as the catalyst at a temperature between 50 and 350° C. and at a pressure in excess of atmospheric.

8. A process for the preparation of lactic acid which comprises reacting carbon monoxide with one mole of acetaldehyde and nine moles of water, using 0.1 mole of concentrated sulfuric acid as the catalyst at a temperature between 130 and 200° C. and a pressure of 900 atmospheres.

DONALD J. LODER.

CERTIFICATE OF CORRECTION.

Patent No. 2,265,945. December 9, 1941.

DONALD J. LODER.

It is hereby certified that error appears in the printed specification of the above numbered patent requiring correction as follows: Page 2, first column, line 52, for the words "in organic" read --inorganic--; and second column, line 69, for "20 mm." read --80 mm.--; and that the said Letters Patent should be read with this correction therein that the same may conform to the record of the case in the Patent Office.

Signed and sealed this 20th day of January, A. D. 1942.

(Seal)

Henry Van Arsdale,
Acting Commissioner of Patents.